US010419162B2

United States Patent
Hakola et al.

(10) Patent No.: US 10,419,162 B2
(45) Date of Patent: Sep. 17, 2019

(54) DYNAMIC SCHEDULING BASED QCL ASSOCIATION FOR TRACKING REFERENCE SIGNAL

(71) Applicant: Nokia Technologies OY, Espoo (FI)

(72) Inventors: Sami-Jukka Hakola, Kempele (FI); Jorma Johannes Kaikkonen, Oulu (FI); Timo Koskela, Oulu (FI); Juha Pekka Karjalainen, Oulu (FI); Mihai Enescu, Espoo (FI)

(73) Assignee: Nokia Technologies OY, Espoo (FI)

( * ) Notice: Subject to any disclaimer, the term of this patent is extended or adjusted under 35 U.S.C. 154(b) by 65 days.

(21) Appl. No.: 15/822,290

(22) Filed: Nov. 27, 2017

(65) Prior Publication Data

US 2019/0165880 A1 May 30, 2019

(51) Int. Cl.
*H04W 72/00* (2009.01)
*H04L 1/00* (2006.01)
*H04W 72/04* (2009.01)

(52) U.S. Cl.
CPC ........... *H04L 1/008* (2013.01); *H04W 72/042* (2013.01)

(58) Field of Classification Search
CPC . H04W 72/042; H04W 56/001; H04W 68/02; H04W 8/22; H04B 7/024; H04B 7/0617; H04B 7/0695; H04B 7/088; H04B 7/0626; H04B 7/0413; H04B 7/0628; H04B 7/063; H04B 7/0639; H04B 7/0874; H04B 7/2684; H04B 7/0456
See application file for complete search history.

(56) References Cited

U.S. PATENT DOCUMENTS

| 2011/0317624 | A1* | 12/2011 | Luo | H04W 72/14 370/328 |
|---|---|---|---|---|
| 2014/0064218 | A1 | 3/2014 | Kim et al. | |
| 2015/0029903 | A1* | 1/2015 | Chen | H04W 72/0446 370/277 |
| 2015/0349855 | A1 | 12/2015 | Sesia et al. | |
| 2015/0349940 | A1* | 12/2015 | Kim | H04J 11/0053 370/329 |

OTHER PUBLICATIONS

International Search Report and Written Opinion dated Feb. 19, 2019 in International Application No. PCT/FI2018/050840.
"3rd Generation Partnership Project; Technical Specification Group Radio Access Network; NR; Physical layer procedures for data (Release 15)", 3GPP TS 38.214 V1.2.4, Nov. 2011, Valbonne, France.

* cited by examiner

*Primary Examiner* — Quan M Hua
(74) *Attorney, Agent, or Firm* — Harness, Dickey & Pierce, P.L.C.

(57) ABSTRACT

When a time domain collision between Tracking Reference Signal (TRS) symbols and downlink shared data channel symbols is detected, the TRS symbols may be multiplexed with the downlink shared data channel symbols from multiple Transmission Reception Points (TRPs) not sharing quasi co-location (QCL) parameters with each other. If a time domain collision between TRS symbols and dynamically or semi-static (e.g., persistent) downlink shared data channel transmissions is detected, transmission and/or reception of the TRS and/or the downlink shared data channel may be adjusted.

18 Claims, 7 Drawing Sheets

DYNAMIC SCHEDULING BASED QCL ASSOCIATION FOR TRACKING REFERENCE SIGNAL

BACKGROUND

In $3^{rd}$ Generation Partnership Project (3GPP) New Radio (NR), a User Equipment (UE) is configured via higher layer (e.g., Radio Resource Control (RRC)) parameters and the Quasi Co-Location (QCL) association between a tracking reference signal (TRS) and source reference signal (RS). The QCL association may include delay, Doppler and spatial domain parameters, wherein a spatial domain parameter may indicate that the same beam may be used to transmit/receive a TRS and the source RS. Using the association information, the UE may apply the same receive beam for TRS reception as used for reception of the source RS.

SUMMARY

One or more example embodiments relate to 3rd Generation Partnership Project (3GPP) New Radio (NR) physical layer design in Release 15 (Rel15) and onwards. More specifically, for example, one or more example embodiments relate to multiplexing a Tracking Reference Signal (TRS) configured for a User Equipment (UE) with other downlink signals, such as shared data channel (e.g., Physical Downlink Shared CHannel (PDSCH) data transmissions).

At least one example embodiment provides a radio access network element including: a memory storing computer-readable instructions. The radio access network element also includes at least one processor coupled to the memory. The at least one processor is configured to execute the computer-readable instructions to: detect a time domain collision between a tracking reference signal and a shared data channel scheduled for transmission to a user equipment in a time domain slot; and adjust transmission scheduling of at least one of the tracking reference signal and the shared data channel in the time domain slot in response to the time domain collision. The radio access network element also includes a transceiver configured to selectively transmit the tracking reference signal and the shared data channel to the user equipment.

At least one other example embodiment provides a user equipment including: a memory storing computer-readable instructions; and at least one processor coupled to the memory. The at least one processor is configured to execute the computer-readable instructions to: detect a time domain collision between a tracking reference signal and a shared data channel from a gNB in a time domain slot; and selectively receive tracking reference signal symbols during the time domain slot in response to the time domain collision.

At least one other example embodiment provides a method for transmitting data, the method including: detecting a time domain collision between a tracking reference signal and a shared data channel scheduled for transmission to a user equipment in a time domain slot; adjusting transmission scheduling of at least one of the tracking reference signal and the shared data channel in the time domain slot in response to the time domain collision; and selectively transmitting the tracking reference signal and the shared data channel to the user equipment.

At least one other example embodiment provides a method for receiving transmitted data, the method including: detecting a time domain collision between a tracking reference signal and a shared data channel from a gNB in a time domain slot; and selectively receiving tracking reference signal symbols during the time domain slot in response to the time domain collision.

At least one other example embodiment provides a non-transitory computer-readable storage medium including computer-executable instructions that, when executed by one or more processors at a radio network access element, cause the radio access network element to perform a method for transmitting data. According to this example embodiment, the method includes: detecting a time domain collision between a tracking reference signal and a shared data channel scheduled for transmission to a user equipment in a time domain slot; adjusting transmission scheduling of at least one of the tracking reference signal and the shared data channel in the time domain slot in response to the time domain collision; and selectively transmitting the tracking reference signal and the shared data channel to the user equipment.

At least one other example embodiment provides a non-transitory computer-readable storage medium including computer-executable instructions that, when executed by one or more processors at a user equipment, cause the user equipment to perform a method for receiving transmitted data. According to at least this example embodiment, the method includes: detecting a time domain collision between a tracking reference signal and a shared data channel from a gNB in a time domain slot; and selectively receiving tracking reference signal symbols during the time domain slot in response to the time domain collision.

According to at least some example embodiments, the shared data channel may be a Physical Downlink Shared Channel (PDSCH).

According to at least some example embodiments, the method may include: determining that the tracking reference signal and the shared data channel are not quasi co-located; and adjusting the transmission scheduling of at least one of the tracking reference signal and the shared data channel by omitting transmission of the tracking reference signal to the user equipment in the time domain slot and/or puncturing the shared data channel at symbol positions corresponding to symbol positions in which the tracking reference signal is scheduled for transmission.

According to at least some example embodiments, the method may further include: determining that the tracking reference signal and the shared data channel are not quasi co-located; determining a hybrid automatic repeat request status for the shared data channel in the time domain slot; and wherein the adjusting adjusts transmission scheduling of at least one of the tracking reference signal and the shared data channel based on the hybrid automatic repeat request status.

The adjusting may further include: omitting transmission of the tracking reference signal in the time domain slot if the hybrid automatic repeat request status indicates retransmission of a transport block on the shared data channel within the time domain slot; or puncturing the shared data channel at symbol positions corresponding to symbol positions in which the tracking reference signal is scheduled for transmission if the hybrid automatic repeat request status indicates a first transmission of a transport block on the shared data channel within the time domain slot.

The method may further include: determining that the tracking reference signal and the shared data channel are quasi co-located; determining that the shared data channel is allocated two demodulation reference signals; and wherein the adjusting includes omitting transmission of the tracking reference signal within the time domain slot.

The method may further include: determining that the tracking reference signal and the shared data channel are quasi co-located; and determining that the shared data channel is allocated one demodulation reference signal. The adjusting may include: omitting transmission of a first tracking reference signal symbol at a first symbol position in the time domain slot; and transmitting a second tracking reference signal symbol at a second symbol position in the time domain slot.

The method may further include: determining that the tracking reference signal and the shared data channel are not quasi co-located; and the selectively receiving may include ignoring transmission of the tracking reference signal from the gNB in the time domain slot.

The method may further include determining that the tracking reference signal and the shared data channel are not quasi co-located; and the selectively receiving may include receiving the tracking reference signal at colliding symbol positions in the time domain slot, and receiving the shared data channel as a punctured shared data channel, the shared data channel being punctured at the colliding symbol positions in the time domain slot.

The method may further include: determining that the tracking reference signal and the shared data channel are not quasi co-located; determining a hybrid automatic repeat request status for the shared data channel in the time domain slot; and wherein the selectively receiving selectively receives the tracking reference signal symbols based on the hybrid automatic repeat request status.

The selectively receiving may include: ignoring transmission of the tracking reference signal symbols in the time domain slot if the hybrid automatic repeat request status indicates retransmission of a transport block on the shared data channel within the time domain slot; or receiving the shared data channel as a punctured shared data channel if the hybrid automatic repeat request status indicates a first transmission of a transport block on the shared data channel within the time domain slot, wherein the shared data channel is punctured at the colliding symbol positions in the time domain slot.

The selectively receiving may include: determining that the tracking reference signal and the shared data channel are quasi co-located; determining that the shared data channel is allocated two demodulation reference signals; and ignoring transmission of the tracking reference signal symbols within the time domain slot. The method may further include performing time and frequency correction for the shared data channel based on the two demodulation reference signals.

The selectively receiving may include: determining that the tracking reference signal and the shared data channel are quasi co-located; determining that the shared data channel is allocated one demodulation reference signal; ignoring transmission of a first of the tracking reference signal symbols at a first symbol position in the time domain slot; and receiving a second of the tracking reference signal symbols at a second symbol position in the time domain slot. The method may further include performing time and frequency correction based on the demodulation reference signal and the second of the tracking reference signal symbols.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

Figure 1:
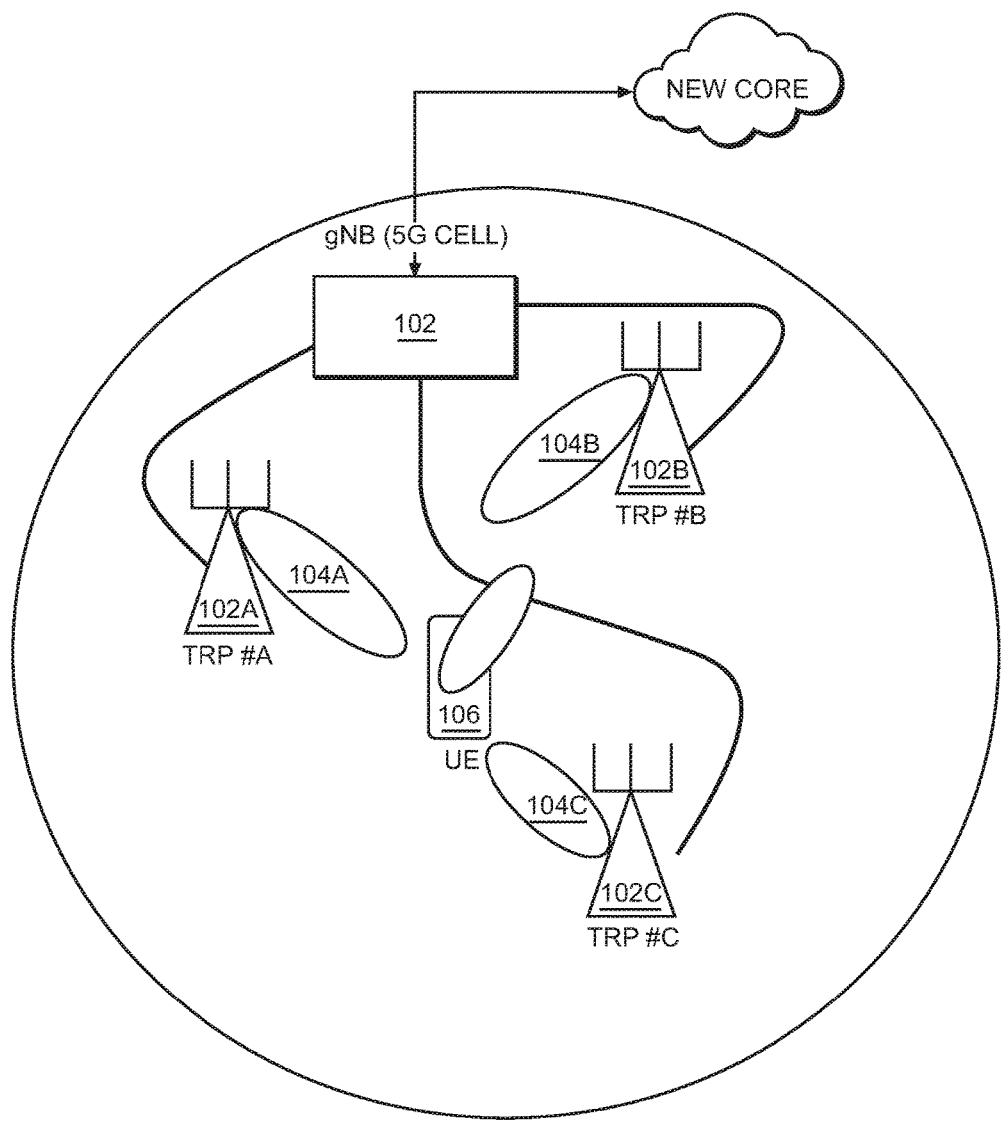
FIG. 1 illustrates a simplified diagram of a portion of a $3^{rd}$ Generation Partnership Project (3GPP) New Radio (NR) access deployment for explaining example embodiments.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Example embodiments will be discussed herein primarily with regard to downlink transmissions from one or more transmission and reception points (TRPs) to one or more User Equipments (UEs). However, it should be understood that example embodiments may be similarly applicable to uplink transmissions from one or more UEs to one or more TRPs. Additionally, although example embodiments will be primarily discussed herein with regard to the Physical Downlink Control CHannel (PDCCH) and the Physical Downlink Shared CHannel (PDSCH), it should be understood that example embodiments may be applicable to other control and shared data channels.

In 3$^{rd}$ Generation Partnership Project (3GPP) New Radio (NR), at least at above 6 GHz, UEs are expected to operate using a more narrow receive beam than an omni-directional beam per transceiver unit. The same applies for gNobeBs (also referred to as gNBs) for which both the control and user plane is operated using transmit and receive beams that are narrower than sector wide transmit and receive beams.

On the downlink, a serving gNB configures a Tracking Reference Signal (TRS) for a UE to enable the UE to perform time and frequency synchronization and/or correction tracking within the serving cell; more specifically, the UE utilizes TRS symbols transmitted during a given time slot to assist with demodulation of the data channel transmitted during the given (or another) time domain slot. In one example, a TRS may be configured as one-port Channel State Information-Reference Signal (CSI-RS) resource(s) with a TRS burst length of 2 consecutive slots, wherein each TRS slot includes two TRS symbols. The TRS symbols have the same symbol positions, with one of a plurality of options being configured via Radio Resource Control (RRC). In one example, the TRS symbols may be transmitted at symbol positions 4 and 8 (where the symbol index starts at 0) within a slot. In another example, the TRS symbols may be transmitted at symbol positions 5 and 9. In yet another example, the TRS symbols may be transmitted at symbol positions 6 and 10.

The bandwidth for a TRS is defined as a minimum of the bandwidth part (BWP) for the UE for which the TRS is configured and ~50 Physical Resource Blocks (PRBs); that is, min(BWP, ~50 PRBs). Moreover, TRS bursts may be configured with different periodicities (e.g., about 10, 20, 40 or 80 ms).

When the gNB configures a periodic TRS for a UE, the UE may use the periodic TRS to align its receive beam with the transmit beam associated with the transmission and reception point (TRP) transmitting the TRS. The UE may also perform fine time and frequency synchronization with regard to the transmitting TRP.

When transmitting data and associated control information from a gNB to a UE on the Physical Downlink Shared CHannel (PDSCH) and the Physical Downlink Control CHannel (PDCCH), for example, the UE may be allocated multiple candidate transmit beams, wherein the transmit beam allocation for the PDCCH is more semi-static, but the transmit beam allocation for the PDSCH is more dynamic (e.g., indicated by the gNB via Downlink Control Information (DCI) on the PDCCH).

In one example, the TRS may be quasi co-located with a downlink reference signal (RS) determining one of the candidate PDSCH transmit beams in terms of a spatial QCL parameter. As discussed herein, quasi co-located (or QCLed) refers to transmission using the same transmit beam. In this example, once a TRS burst is transmitted, the UE uses the same receive beam for receiving both the TRS and the scheduled PDSCH of which DMRS may have the spatial QCL association with the TRS. In this case, there are at least as many TRSs as TRPs from which the PDSCH may be transmitted to the UE. In this configuration, periodic TRS symbols may result in time domain collisions between TRS symbols and PDSCH symbols within a given time domain slot. As discussed herein, a time domain collision refers to transmission scheduling (and/or transmission) of TRS symbols and PDSCH symbols in the same slot using overlapping time domain resources (e.g., at the same symbol positions).

According to one or more example embodiments, when a time domain collision is detected, periodic TRS symbols may be multiplexed with PDSCH symbols from multiple TRPs not sharing QCL parameters with each other. In at least one example embodiment, if a time domain collision between periodic TRS symbols and dynamically or semi-static (e.g., persistent) PDSCH transmissions is detected, transmission and/or reception of the TRS and/or the PDSCH may be adjusted.

FIG. 1 illustrates a simplified diagram of a portion of a 3GPP NR access deployment for explaining example embodiments.

Referring to FIG. 1, the 3GPP NR radio access deployment includes a gNB 102 having one or more transmission and reception points (TRPs) 102A, 102B, 102C. Each TRP 102A, 102B, 102C may be, for example, a remote radio head (RRH) or remote radio unit (RRU) including at least, for example, a radio frequency (RF) antenna and radio transceiver for transmitting and receiving data within a geographical area. In this regard, the TRPs 102A, 102B, 102C provide cellular resources for UEs within a geographical coverage area. In some cases, baseband processing may be divided between the TRPs 102A, 102B, 102C and gNB 102 in one 5$^{th}$ Generation (5G) cell. Alternatively, the baseband processing may be performed at the gNB 102. In the example shown in FIG. 1, the TRPs 102A, 102B, 102C are configured to communicate with a UE via at least transmit/receive beams 104A, 104B, 104C, respectively. The gNB 102 communicates with the core network, which is referred to as the New Core in 3GPP NR.

The TRPs 102A, 102B, 102C may have independent schedulers, or the gNB 102 may perform joint scheduling among the TRPs 102A, 102B, 102C. For example purposes, example embodiments will be described with regard to the gNB 102 performing joint scheduling among the TRPs 102A, 102B, 102C. However, example embodiments should not be limited to the example discussed herein.

Although only a single UE 106 is shown in FIG. 1, example embodiments should not be limited to this example. Rather, the gNB 102 and TRPs 102A, 102B, 102C may provide communication services to a relatively large number of UEs within the coverage area of the TRPs 102A, 102B, 102C.

Figure 2:
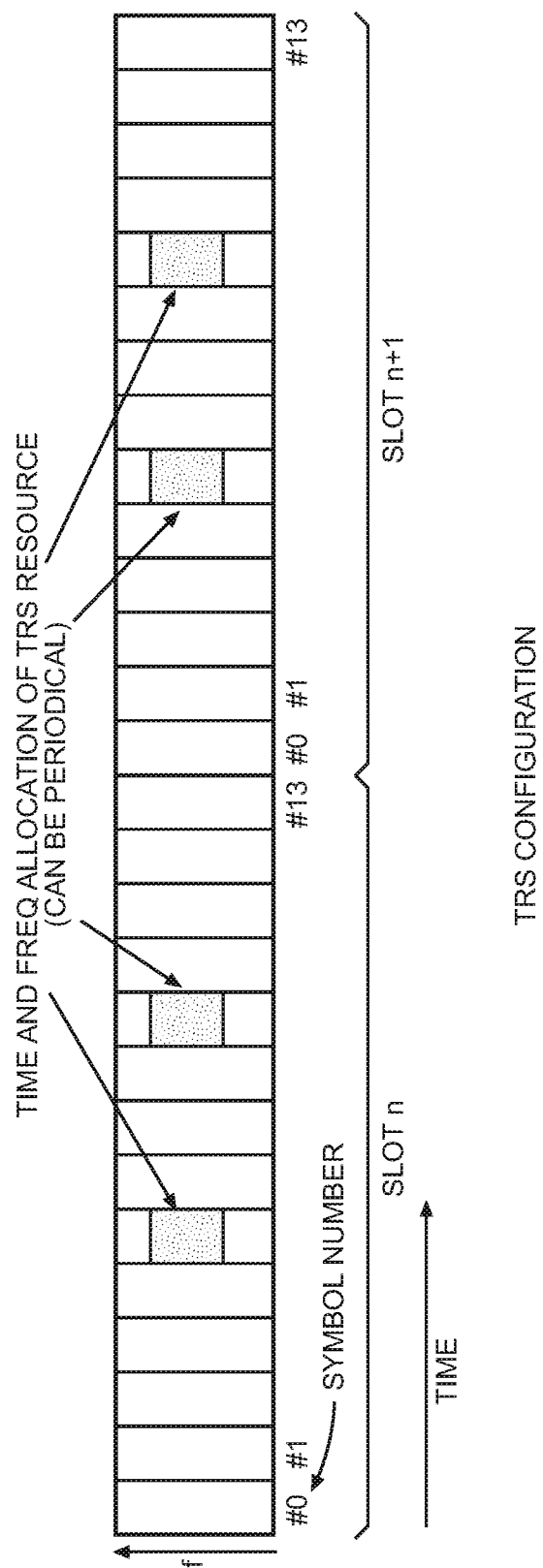
FIG. 2 illustrates an example configuration for a Tracking Reference Signal (TRS).

FIG. 2 illustrates an example configuration for a TRS. In more detail, FIG. 2 illustrates an example configuration of a TRS resource spanned across two consecutive slots n and n+1. As shown in FIG. 2, each slot includes 14 symbols (indexed #0 through #13), which are multiplexed in the time domain. In this example, the TRS symbols are transmitted (or scheduled for transmission) periodically at symbol positions #5 and #9 in the time slots n and n+1.

For reception of the PDCCH and PDSCH, the UE 106 may be configured according to a transmission configuration indication (TCI) table to indicate the transmit beam from which the PDCCH and the PDSCH are transmitted. For PDCCH reception, the UE 106 may be configured with a table in which a downlink RS resource corresponding to a transmit beam is stored in association with either each control resource set (CORESET) or search space. The CORESET or search space configuration indicates a time-domain pattern indicating when to assume a certain transmit beam to be used for transmitting the PDCCH.

For PDSCH reception, the UE 106 may be configured with a table where each table index is associated with a certain downlink RS resource corresponding to a certain transmit beam. The gNB 102 provides the UE 106 with an index via the PDCCH to indicate which transmit beam is to be used for transmission of the corresponding PDSCH in a dynamic manner, such that the PDSCH may be allocated to transmit beams dynamically. In one example, scheduling information for the PDSCH on the PDCCH includes a TCI index pointing to a transmit beam to be used for PDSCH transmission.

Figure 5:
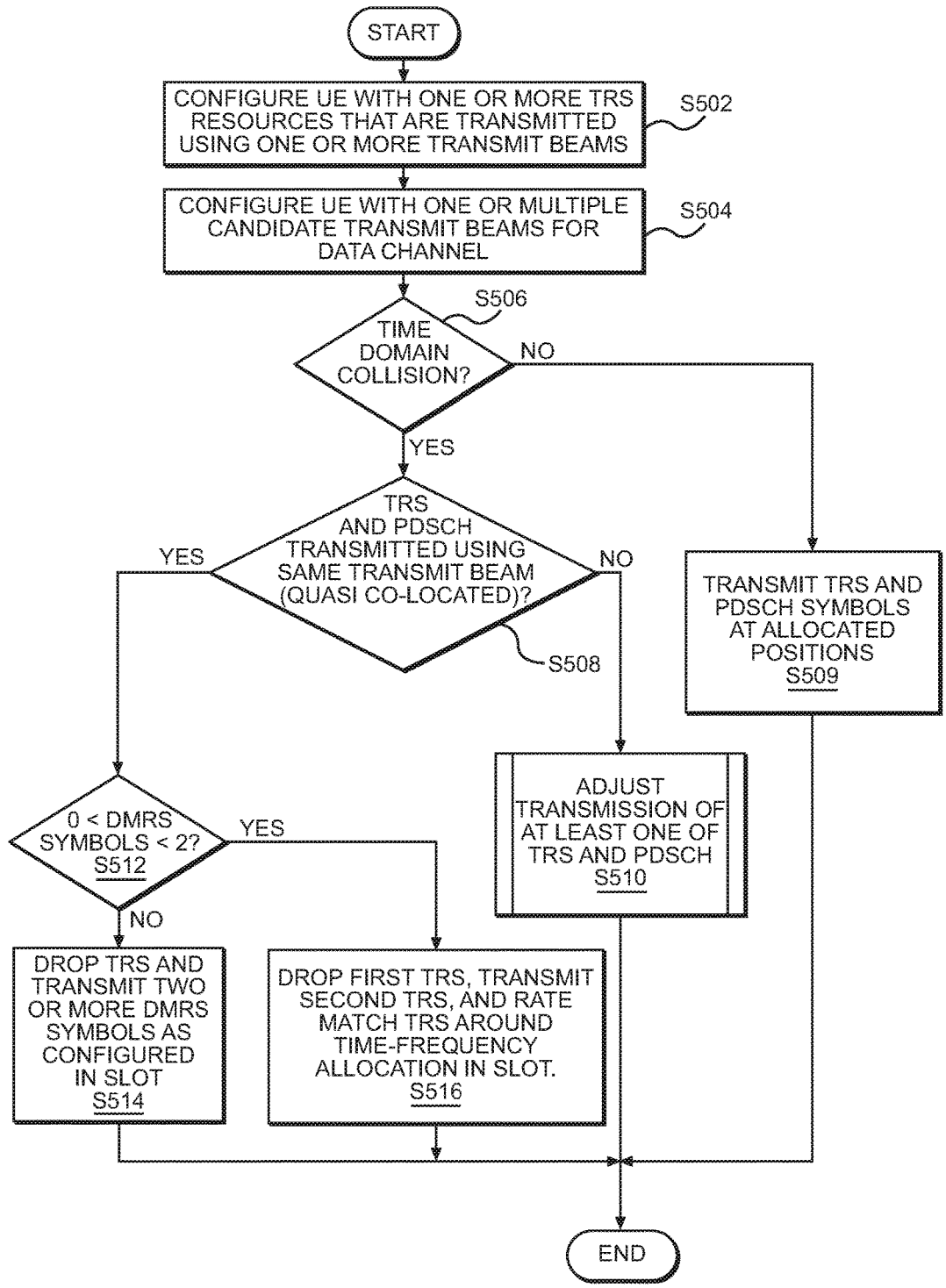
FIG. 5 is a flow chart illustrating a method for dynamic scheduling and transmission of data, according to an example embodiment.

FIG. 5 is a flow chart illustrating a method for dynamic scheduling and transmission of data, according to an example embodiment. For example, purposes, the example embodiment shown in FIG. 5 will be discussed with regard to FIG. 1. However, example embodiments should not be limited to this example.

Referring to FIG. 5, at step S502 the gNB 102 configures the UE 106 with one or more TRS resources transmitted using one or more of the transmit/receive beams 104A, 104B and 104C corresponding to the TRPs 102A, 102B and 102C, respectively. According to at least one example embodiment, the gNB 102 may configure the UE 106 via RRC level signaling, where the gNB 102 configures the UE 106 with one or more TRS resources. In configuring the UE 106, the gNB 102 indicates the spatial QCL association for each TRS. The spatial QCL association may be based on, for example, beam management or Channel State Information (CSI)-related reference signals that the UE 106 is configured to detect and measure for beam management purposes in the cell. Upon receiving beam management measurement results from the UE 106, for example, the gNB 102 may determine the potential (candidate) transmit beams for the UE 106. The gNB 102 may then configure the UE 106 with which transmit beam the configured TRS is spatially QCLed; that is, for example, which transmit beam is used for the TRS transmission.

At step S504, the gNB 102 configures the UE 106 with one or more candidate beams for transmission of the PDSCH to the UE 106. As discussed above the gNB 102 may configure the UE 106 using a transmission configuration indication (TCI) table.

At step S506, the gNB 102 determines whether there is a time domain collision between the configured TRS resources and the candidate beams for the PDSCH schedule for transmission in the current (next) time domain slot (also referred to herein as a time slot or slot). That is, for example, the gNB 102 determines whether time domain resources have been allocated for transmission of the TRS resources and the PDSCH in the same slot using overlapping time domain resources (symbol positions). As discussed herein, overlapping time domain resources or symbol positions may be referred to as colliding symbol positions.

If the gNB 102 determines that a time domain collision does not exist, then at step S509 the gNB 102 proceeds with transmission of the TRS symbols and the PDSCH as configured (or, alternatively, allocated) at steps S502 and S504, and the process terminates.

Returning to step S506, if the gNB 102 determines that a time domain collision exists, then at step S508 the gNB 102 determines whether the TRS and PDSCH are to be transmitted to the UE 106 using the same transmit beam. In at least one example embodiment, the gNB 102 may determine whether the same transmit beam is to be used to transmit the TRS and the PDSCH to the UE 106 based on the spatial QCL configuration of the TRS and the PDSCH to be transmitted. That is, for example, in the spatial QCL configuration of TRS and DMRS of PDSCH, the same RS has been used as a source RS.

If the gNB 102 determines that the TRS symbols and the PDSCH are scheduled for transmission using different transmit beams, then at step S510 the gNB 102 adjusts transmission of at least one of the TRS symbols and the PDSCH.

In a first example, at step S510 the gNB 102 omits (or, alternatively, drops or interrupts) transmission of the TRS symbols, and schedules (and transmits) the PDSCH entirely within the current (or next) time domain slot, including the time domain resources for the PDSCH that overlap with the time domain resources in which the TRS symbols are scheduled for transmission (colliding symbol positions).

In a second example, at step S510 the gNB 102 punctures the time domain symbols of the PDSCH that overlap with the TRS symbols at the colliding symbol positions), such that the TRS symbols are transmitted using the overlapping time domain resources, and the PDSCH is transmitted as a punctured transmission. In puncturing, the gNB 102 omits transmission of the time domain symbols of the PDSCH symbols that overlap with TRS symbols. In this case, the TRS symbols transmitted using the overlapping time domain resources may be transmitted from another spatial direction using another transmit beam.

In a third example, the gNB 102 adjusts transmission of the TRS symbols and/or the PDSCH based on a Hybrid Automatic Repeat Request (HARQ) status associated with the UE 106. In this example, in the case of a new transport block (a first transmission of a given transport block), the gNB 102 punctures the time domain symbols of the PDSCH that overlap with the TRS symbols (at the colliding symbol positions, such that the TRS symbols are transmitted using the overlapping time domain resources (first example). In the case of a retransmission of a transport block, the gNB 102 omits (or, alternatively, drops or interrupts) transmission of the TRS symbols within the given time slot, and schedules transmission of the PDSCH entirely within the time slot, including using the time domain resources overlapping with the time domain resources in which the TRS symbols are scheduled for transmission.

According to at least one example embodiment, the use of one of the three examples may configured per UE using dedicated control signaling, or may be common to all UEs in a cell using a broadcast type signaling in the cell.

Returning to step S508, if the gNB 102 determines that the TRS symbols and the PDSCH are scheduled for transmission using the same transmit beam, then at step S512 the gNB 102 determines whether the PDSCH allocation includes only one demodulation reference signal (DMRS) symbol in the current slot. In this example, the gNB 102 has knowledge of the number of DRMS symbols based on the configuration for the UE 106.

Figure 3:
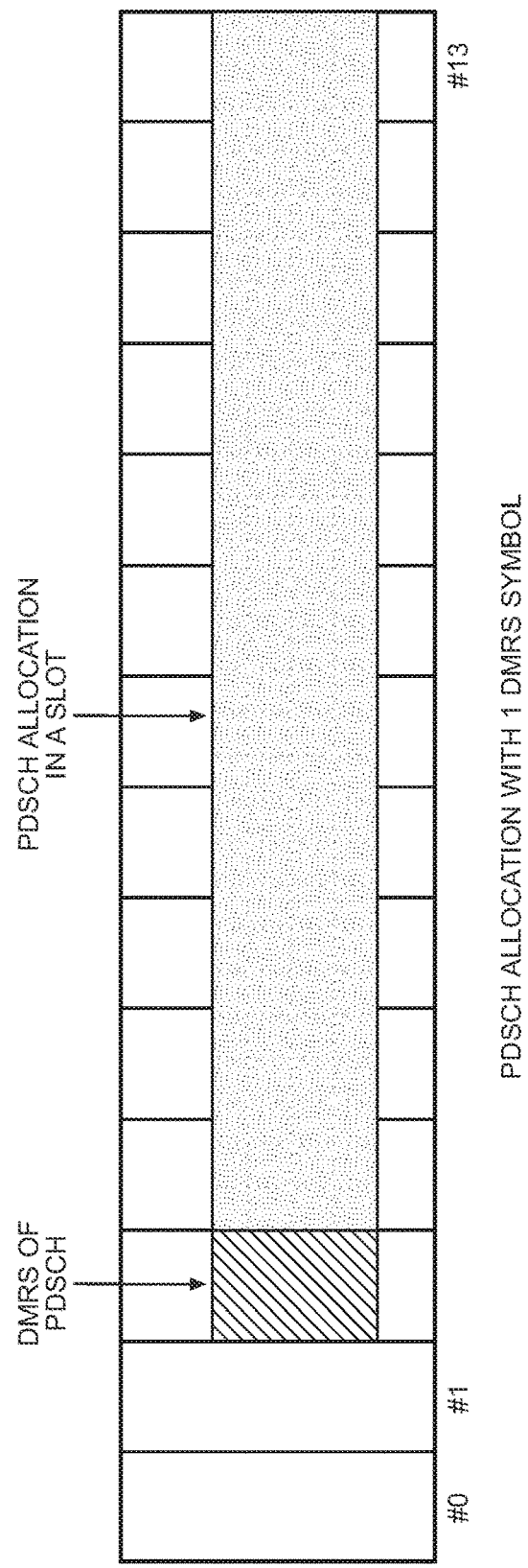
FIG. 3 illustrates an example Physical Downlink Shared Channel (PDSCH) allocation with one demodulation reference signal (DMRS) symbol in a slot.

FIG. 3 illustrates an example PDSCH allocation with one DMRS symbol in a slot. In this example, the DMRS symbol is transmitted in slot #2, and the PDSCH is allocated slots #3-#13.

Returning to FIG. 5, if the PDSCH allocation includes only one DMRS symbol in the time slot, then at step S516 the gNB 102 drops (interrupts or does not transmit) a first of the TRS symbols, but transmits the second TRS symbol while rate matching around the time and frequency allocation in the current slot. Rate matching is to match the number of bits in transport block (TB) to the number of bits that may be transmitted in the given allocation. When determining the allocation for the PDSCH in rate matching around the time and frequency allocation of TRS, the rate matching function prepares the transport block assuming that the time and frequency resources of TRS are not in use for the PDSCH transmission. In this case, the TRS symbol and PDSCH may be transmitted from the same or similar spatial direction using the same or similar transmit beam.

In the example shown in FIG. 3, if the TRS symbols are schedule for transmission at symbol positions #5 and #9 as in FIG. 2, then the gNB 102 omits (or, alternatively, drops or interrupts) the transmission of the TRS symbol at position #5, but transmits the TRS symbol at position #9.

Returning to step S512, if the gNB 102 determines that the PDSCH allocation includes more than one DMRS symbol (e.g., two or more DMRS symbols) in the current slot, then at step S514 the gNB 102 omits (or, alternatively, drops or interrupts) transmission of both TRS symbols in the time slot, and transmits the PDSCH entirely including using the overlapping time domain resources in which the TRS symbols are scheduled for transmission.

Figure 4:
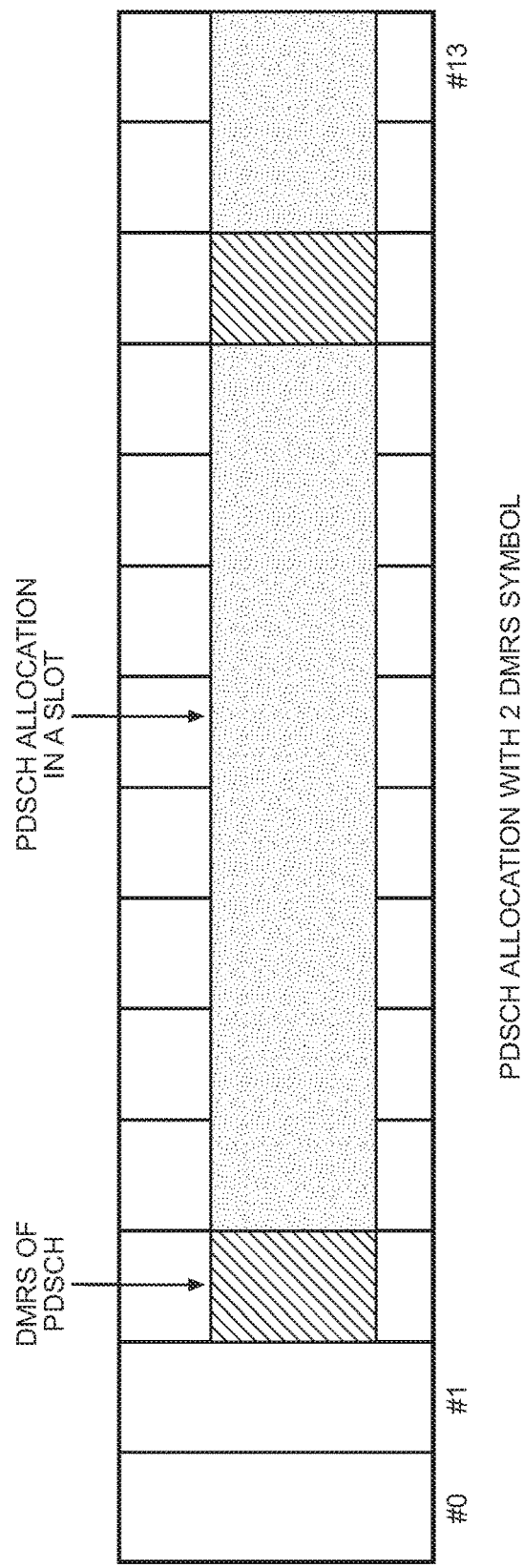
FIG. 4 illustrates an example PDSCH with two DMRS symbols in a slot.

FIG. 4 illustrates an example PDSCH with two DMRS symbols in a slot. As shown in FIG. 4, the DMRS symbols are transmitted at symbol positions #2 and #11 within the time slot. Although FIG. 4 illustrates only two DMRS symbols, more than two DMRS symbols may be utilized.

Figure 6:
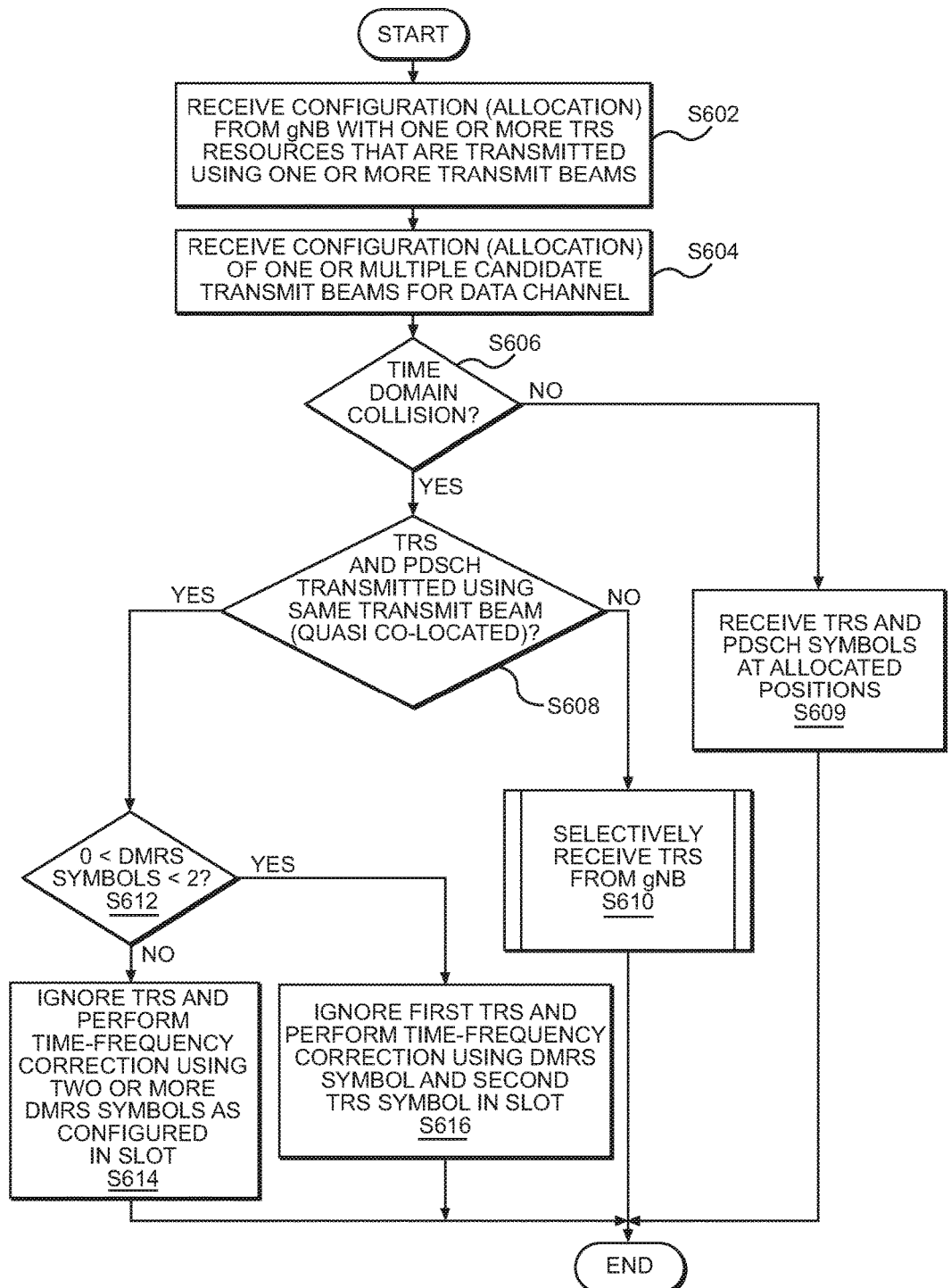
FIG. 6 is a flow chart illustrating a method for dynamic scheduling and reception of data, according to an example embodiment.

FIG. 6 is a flow chart illustrating a method for dynamic scheduling and reception of data, according to an example embodiment. For example, purposes, the example embodiment shown in FIG. 6 will also be discussed with regard to FIG. 1. However, example embodiments should not be limited to this example.

Referring to FIG. 6, at step S602 the UE 106 is configured by the gNB 102 with one or more TRS resources to be transmitted using one or more of the transmit/receive beams 104A, 104B and 104C corresponding to the TRPs 102A, 102B and 102C, respectively.

At step S604, the UE 106 is configured by the gNB 102 with one or more candidate beams for transmission of the PDSCH to the UE 106.

At step S606, the UE 106 determines whether there is a time domain collision between the configured TRS resources and the candidate beams for transmission of the PDSCH scheduled for transmission during the current (or next) time slot. That is, for example, the UE 106 determines whether the time domain resources are allocated for transmission of the TRS resources and the PDSCH in the same slot using overlapping time domain resources (colliding symbol positions).

If the UE 106 determines that a time domain collision does not exist, then at step S609 the UE 106 receives (demodulates, decodes and recovers) transmission of the TRS symbols and the PDSCH as allocated at steps S602 and S604, and the process terminates.

Returning to step S606, if the UE 106 determines that a time domain collision exists, then at step S608 the UE 106 determines whether the TRS and PDSCH are scheduled to be received using the same transmit beam. In at least one example embodiment, the UE 106 may determine whether the same transmit beam is to be used based on the spatial QCL configuration of TRS and PDSCH received from the gNB 102. That is, for example, in spatial QCL configuration of TRS and DMRS of PDSCH, the same RS has been used as a source RS.

If the UE 106 determines that the TRS symbols and the PDSCH are scheduled to be received using different transmit beams, then at step S610 the UE 106 selectively receives the TRS symbols from the gNB 102.

In a first example, at step S610 the UE 106 ignores (or disregards) the TRS symbols transmitted in the current slot, and receives the PDSCH entirely within the current slot.

In a second example, at step S610 the UE 106 receives the TRS symbols at the overlapping time domain resources (colliding symbol positions), and assumes that the PDSCH symbols are punctured at the colliding symbol positions for demodulation, decoding and recovery of the PDSCH.

In yet another example, the UE 106 selectively receives the TRS symbols and the PDSCH symbols based on a Hybrid Automatic Repeat Request (HARQ) status for the current slot. In this example, in the case of scheduling a new transport block (a first transmission) during the time slot, the UE 106 receives the TRS symbols as configured in the overlapping time domain resources (colliding symbol positions), and assumes that the PDSCH symbols at the colliding symbol positions are punctured for demodulation, decoding and recovery of the PDSCH (second example). In the case of a retransmission of a transport block, however, the UE 106 ignores (or disregards) the TRS symbols transmitted in the current slot, and receives the PDSCH entirely within the current slot (first example).

According to at least one example embodiment, the use of one of the three examples may be set to correspond to the example option discussed above with regard to step S510 in FIG. 5.

Returning to step S608, if the UE 106 determines that the TRS symbols and the PDSCH are scheduled to be received using the same transmit beam, then at step S612 the UE 106 determines whether the PDSCH allocation includes only one DMRS symbol in the current slot. In this example, the UE 106 has knowledge of the number of DRMS symbols based on the configuration for the UE 106 provided by the gNB 102.

If the PDSCH allocation includes only one DMRS symbol in the current slot, then at step S616 the UE 106 ignores a first of the TRS symbols, but receives the second TRS symbol. The UE 106 then performs time and frequency correction using the DMRS symbol and the second TRS symbol.

In the example shown in FIG. 3, if the TRS symbols are at positions symbol positions #5 and #9, then the UE 106 ignores the transmission of the TRS symbol at position #5 (receiving a PDSCH symbol instead), but receives the TRS symbol at position #9.

Returning to step S612, if the UE 106 determines that the PDSCH allocation includes more than one DMRS symbol (e.g., two or more DMRS symbols) in the current slot, then at step S614 the UE 106 ignores transmission of the TRS symbols in the current slot, receiving PDSCH symbols instead at the colliding symbol positions, and performs time and frequency correction based on the received two or more DMRS symbols instead of the TRS symbols.

Figure 7:
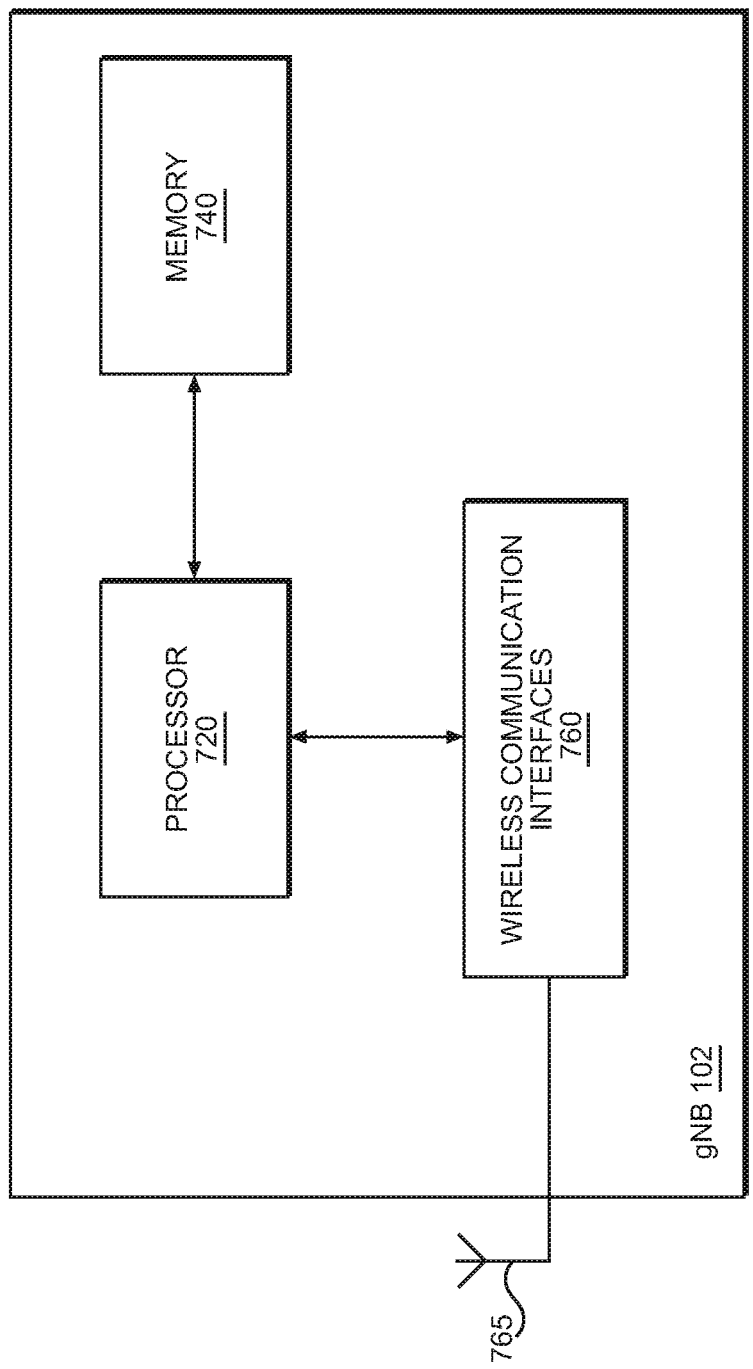
FIG. 7 is a block diagram illustrating an example embodiment of a gNodeB.

FIG. 7 illustrates an example embodiment of the gNB 102 shown in FIG. 1.

As shown, the gNB 102 includes: a memory 740; a processor 720 connected to the memory 740; various interfaces 760 connected to the processor 720; and an antenna 765 connected to the various interfaces 760. The various interfaces 760 and the antenna 765 may constitute a transceiver for transmitting/receiving data from/to the gNB 102 via a plurality of wireless beams or from/to the plurality of transmission and reception points 102A, 102B, 102C, etc. As will be appreciated, depending on the implementation of the gNB 102, the gNB 102 may include many more components than those shown in FIG. 7. However, it is not necessary that all of these generally conventional components be shown in order to disclose the illustrative example embodiment.

The memory 740 may be a computer readable storage medium that generally includes a random access memory (RAM), read only memory (ROM), and/or a permanent mass storage device, such as a disk drive. The memory 740 also stores an operating system and any other routines/modules/applications for providing the functionalities of the gNB 102 (e.g., functionalities of a gNB, methods according to the example embodiments, etc.) to be executed by the processor 720. These software components may also be loaded from a separate computer readable storage medium into the memory 740 using a drive mechanism (not shown). Such separate computer readable storage medium may include a disc, tape, DVD/CD-ROM drive, memory card, or other like computer readable storage medium (not shown). In some example embodiments, software components may be loaded into the memory 740 via one of the various interfaces 760, rather than via a computer readable storage medium.

The processor 720 may be configured to carry out instructions of a computer program by performing the arithmetical, logical, and input/output operations of the system. Instructions may be provided to the processor 720 by the memory 740.

The various interfaces 760 may include components that interface the processor 720 with the antenna 765, or other input/output components. As will be understood, the various interfaces 760 and programs stored in the memory 740 to set forth the special purpose functionalities of the gNB 102 will vary depending on the implementation of the gNB 102.

The interfaces 760 may also include one or more user input devices (e.g., a keyboard, a keypad, a mouse, or the like) and user output devices (e.g., a display, a speaker, or the like).

Although not specifically discussed herein, the configuration shown in FIG. 7 may be utilized to implement, inter alia, the TRPs 102A, 102B, 102C, the UE 106, other radio access and backhaul network elements and/or devices. In this regard, for example, the memory 740 may store an operating system and any other routines/modules/applications for providing the functionalities of the TRPs, UE, etc. (e.g., functionalities of these elements, methods according to the example embodiments, etc.) to be executed by the processor 720.

At least one example embodiment may reduce transmission overhead because a periodic TRS need not be transmitted when the UE is unable to receive the periodic TRS (e.g., in the event of a time domain collision) because of, for example, limited receive beam resources (e.g., the ability to receive transmission from only a single direction at a time). In this example, the UE receives the PDSCH using the limited receive beam resources. Additionally, utilization of gNB transmission and/or processing resources may also be saved because the TRS need not be transmitted (e.g., in a given time slot).

Additionally, even in situations of limited receive beam resources at the UE (e.g., the UE is able to receive signal from only one spatial direction at a time), the UE may still receive the periodic TRS and the PDSCH (e.g., by puncturing the PDSCH when TRS is transmitted from a different transmit beam). This may facilitate more efficient time and frequency synchronization tracking support for the UE.

One or more example embodiments may also increase transmission efficiency by utilizing efficient resource multiplexing when the TRS and PDSCH are transmitted using the same/similar transmit beam. In this case, the UE may receive both the TRS and the PDSCH, and the PDSCH is rate matched around TRS resources. In this example, performance degradation for PDSCH may be limited.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing users, User Equipments, CPEs, gateways, base stations, CRANs, eNBs, RRHs, gNBs, femto base stations, nodes, network controllers, computers, and the like. As discussed later, such existing hardware may include, inter alia, one or more Central Processing Units (CPUs), system-on-chip (SOC) devices, digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

The terms "including" and/or "having", as used herein, are defined as comprising (i.e., open language). The term "coupled", as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, users, User Equipments, CPEs, gateways, base stations, CRANs, eNBs, RRHs, gNBs, femto base stations, nodes, network controllers, computers, and the like, may be (or include) hardware, firmware, hardware executing software or any combination thereof. Such hardware may include one or more Central Processing Units (CPUs), system-on-chip (SOC) devices, digital signal processors (DSPs), application-specific-integrated-circuits (ASICs), field programmable gate arrays (FPGAs) computers or the like configured as special purpose machines to perform the functions described herein as well as any other well-known functions of these elements. In at least some cases, CPUs, SOCs, DSPs, ASICs and FPGAs may generally be referred to as processing circuits, processors and/or microprocessors.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

Reference is made in detail to embodiments, examples of which are illustrated in the accompanying drawings, wherein like reference numerals refer to the like elements throughout. In this regard, the example embodiments may have different forms and should not be construed as being limited to the descriptions set forth herein. Accordingly, the example embodiments are merely described below, by referring to the figures, to explain example embodiments of the present description. Aspects of various embodiments are specified in the claims.

What is claimed is:

1. A radio access network element comprising:
   at least one processor; and
   at least one memory including computer-readable instructions, the at least one memory and the computer-readable instructions configured to, with the at least one processor, cause the radio access network element to
      detect a time domain collision between a tracking reference signal and a shared data channel transmission scheduled for transmission to a user equipment in a time domain slot,
      determine that the tracking reference signal and the shared data channel transmission are not quasi co-located,
      determine a hybrid automatic repeat request status for the shared data channel transmission in the time domain slot,
      adjust transmission scheduling of at least one of the tracking reference signal or the shared data channel transmission in the time domain slot in response to the time domain collision and based on the hybrid automatic repeat request status, and
      selectively transmit the tracking reference signal and the shared data channel transmission to the user equipment.

2. The radio access network element of claim 1, wherein the shared data channel transmission is a Physical Downlink Shared Channel (PDSCH) transmission.

3. The radio access network element of claim 1, wherein the at least one memory and the computer-readable instructions are configured to, with the at least one processor, cause the radio access network element to
   adjust the transmission scheduling of at least one of the tracking reference signal or the shared data channel transmission by omitting transmission of the tracking reference signal to the user equipment in the time domain slot.

4. The radio access network element of claim 1, wherein the at least one memory and the computer-readable instructions are configured to, with the at least one processor, cause the radio access network element to
   adjust the transmission scheduling of at least one of the tracking reference signal or the shared data channel transmission by puncturing the shared data channel transmission at symbol positions corresponding to symbol positions in which the tracking reference signal is scheduled for transmission.

5. The radio access network element of claim 1, wherein the at least one memory and the computer-readable instructions are configured to, with the at least one processor, cause the radio access network element to
adjust the transmission scheduling of at least one of the tracking reference signal or the shared data channel transmission by
omitting transmission of the tracking reference signal in the time domain slot in response to the hybrid automatic repeat request status indicating retransmission of a transport block on the shared data channel within the time domain slot, or
puncturing the shared data channel transmission at symbol positions corresponding to symbol positions in which the tracking reference signal is scheduled for transmission in response to the hybrid automatic repeat request status indicating a first transmission of a transport block on the shared data channel within the time domain slot.

6. The radio access network element of claim 1, wherein the at least one memory and the computer-readable instructions are configured to, with the at least one processor, cause the radio access network element to
determine that the tracking reference signal and the shared data channel transmission are quasi co-located;
determine that two symbols are allocated to demodulation reference signals on the shared data channel; and
omit transmission of the tracking reference signal within the time domain slot.

7. The radio access network element of claim 1, wherein the at least one memory and the computer-readable instructions are configured to, with the at least one processor, cause the radio access network element to
determine that the tracking reference signal and the shared data channel transmission are quasi co-located;
determine that one symbol is allocated to a demodulation reference signal on the shared data channel;
omit transmission of a first tracking reference signal symbol at a first symbol position in the time domain slot; and
transmit a second tracking reference signal symbol at a second symbol position in the time domain slot.

8. A user equipment comprising:
at least one processor; and
at least one memory including computer-readable instructions, the at least one memory and the computer-readable instructions configured to, with the at least one processor, cause the user equipment to
detect a time domain collision between a tracking reference signal and a shared data channel transmission from a base station in a time domain slot,
determine that the tracking reference signal and the shared data channel transmission are not quasi co-located, and
selectively receive tracking reference signal symbols during the time domain slot in response to the time domain collision and based on a hybrid automatic repeat request status for the shared data channel transmission in the time domain slot.

9. The user equipment of claim 8, wherein the shared data channel transmission is a Physical Downlink Shared Channel (PDSCH) transmission.

10. The user equipment of claim 8, wherein the at least one memory and the computer-readable instructions are configured to, with the at least one processor, cause the user equipment to
ignore transmission of the tracking reference signal from the base station in the time domain slot.

11. The user equipment of claim 8, wherein the at least one memory and the computer-readable instructions are configured to, with the at least one processor, cause the user equipment to
receive the tracking reference signal at colliding symbol positions in the time domain slot; and
receive the shared data channel transmission as a punctured shared data channel transmission, the shared data channel transmission being punctured at the colliding symbol positions in the time domain slot.

12. A method for transmitting data, comprising:
detecting a time domain collision between a tracking reference signal and a shared data channel transmission scheduled for transmission to a user equipment in a time domain slot;
determining that the tracking reference signal and the shared data channel transmission are not quasi co-located:
determining a hybrid automatic repeat request status for the shared data channel transmission in the time domain slot;
adjusting transmission scheduling of at least one of the tracking reference signal or the shared data channel transmission in the time domain slot in response to the time domain collision and based on the hybrid automatic repeat request status; and
selectively transmitting the tracking reference signal and the shared data channel transmission to the user equipment.

13. The method of claim 12, wherein the shared data channel transmission is a Physical Downlink Shared Channel (PDSCH) transmission.

14. The method of claim 12, wherein
the adjusting adjusts the transmission scheduling of at least one of the tracking reference signal or the shared data channel transmission by omitting transmission of the tracking reference signal to the user equipment in the time domain slot.

15. The method of claim 12,
wherein
the adjusting adjusts the transmission scheduling of at least one of the tracking reference signal or the shared data channel transmission by puncturing the shared data channel transmission at symbol positions corresponding to symbol positions in which the tracking reference signal is scheduled for transmission.

16. The method of claim 12, wherein the adjusting comprises:
omitting transmission of the tracking reference signal in the time domain slot in response to the hybrid automatic repeat request status indicating retransmission of a transport block on the shared data channel within the time domain slot; or
puncturing the shared data channel transmission at symbol positions corresponding to symbol positions in which the tracking reference signal is scheduled for transmission in response to the hybrid automatic repeat request status indicating a first transmission of a transport block on the shared data channel within the time domain slot.

17. The method of claim 12, further comprising:
determining that the tracking reference signal and the shared data channel transmission are quasi co-located;
determining that two symbols are allocated to demodulation reference signals on the shared data channel; and
wherein
the adjusting includes omitting transmission of the tracking reference signal within the time domain slot.

18. The method of claim 12, further comprising:
determining that the tracking reference signal and the shared data channel transmission are quasi co-located;
determining that one symbol is allocated to a demodulation reference signal on the shared data channel; and
wherein
the adjusting includes
  omitting transmission of a first tracking reference signal symbol at a first symbol position in the time domain slot, and
  transmitting a second tracking reference signal symbol at a second symbol position in the time domain slot.

* * * * *